Jan. 30, 1968 R. K. SEDGWICK ET AL 3,366,248
TOOL IDENTIFICATION SYSTEM
Original Filed Feb. 26, 1962 4 Sheets-Sheet 3
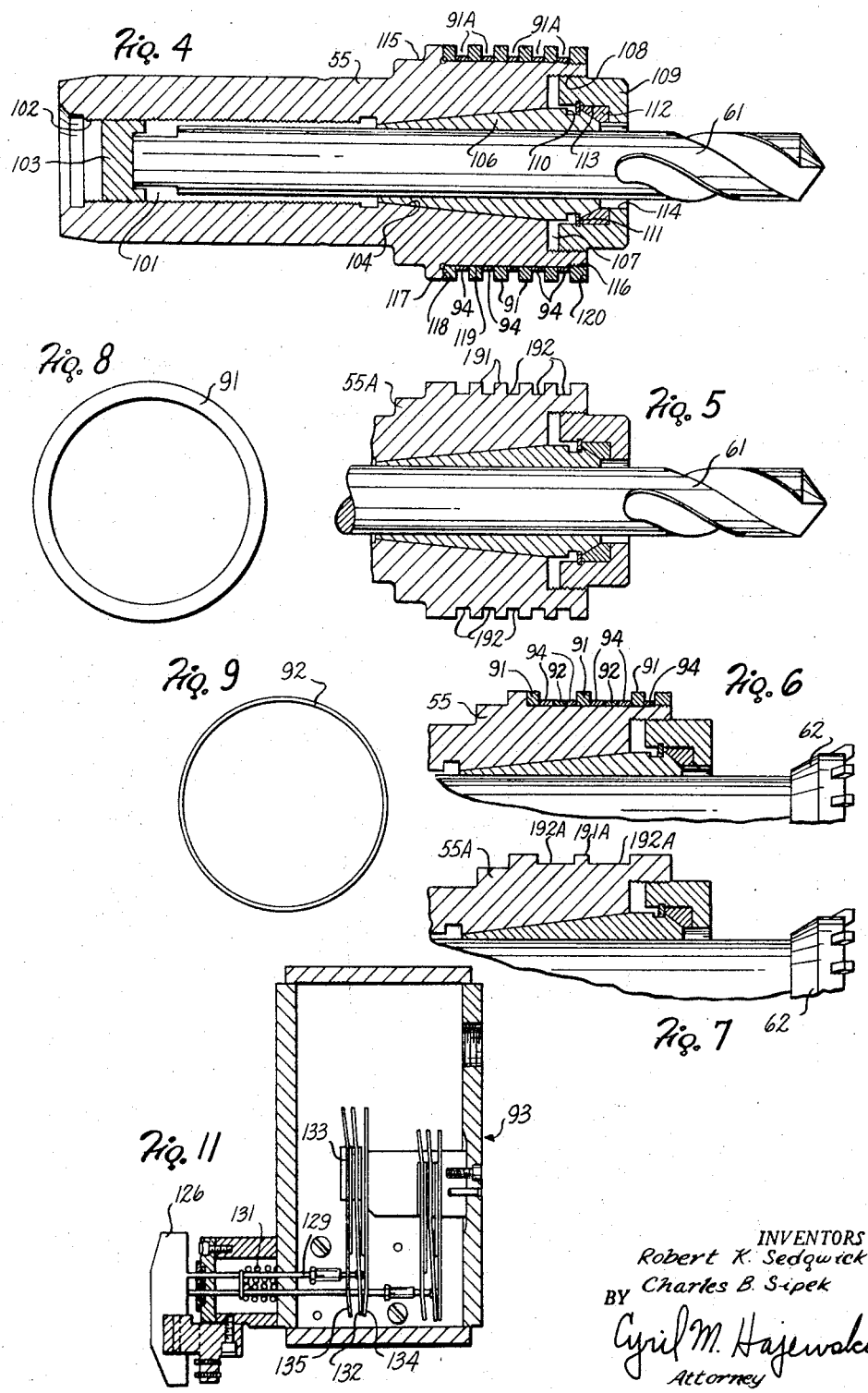
INVENTORS
Robert K. Sedgwick
Charles B. Sipek
BY
Cyril M. Hajewski
Attorney

United States Patent Office 3,366,248
Patented Jan. 30, 1968

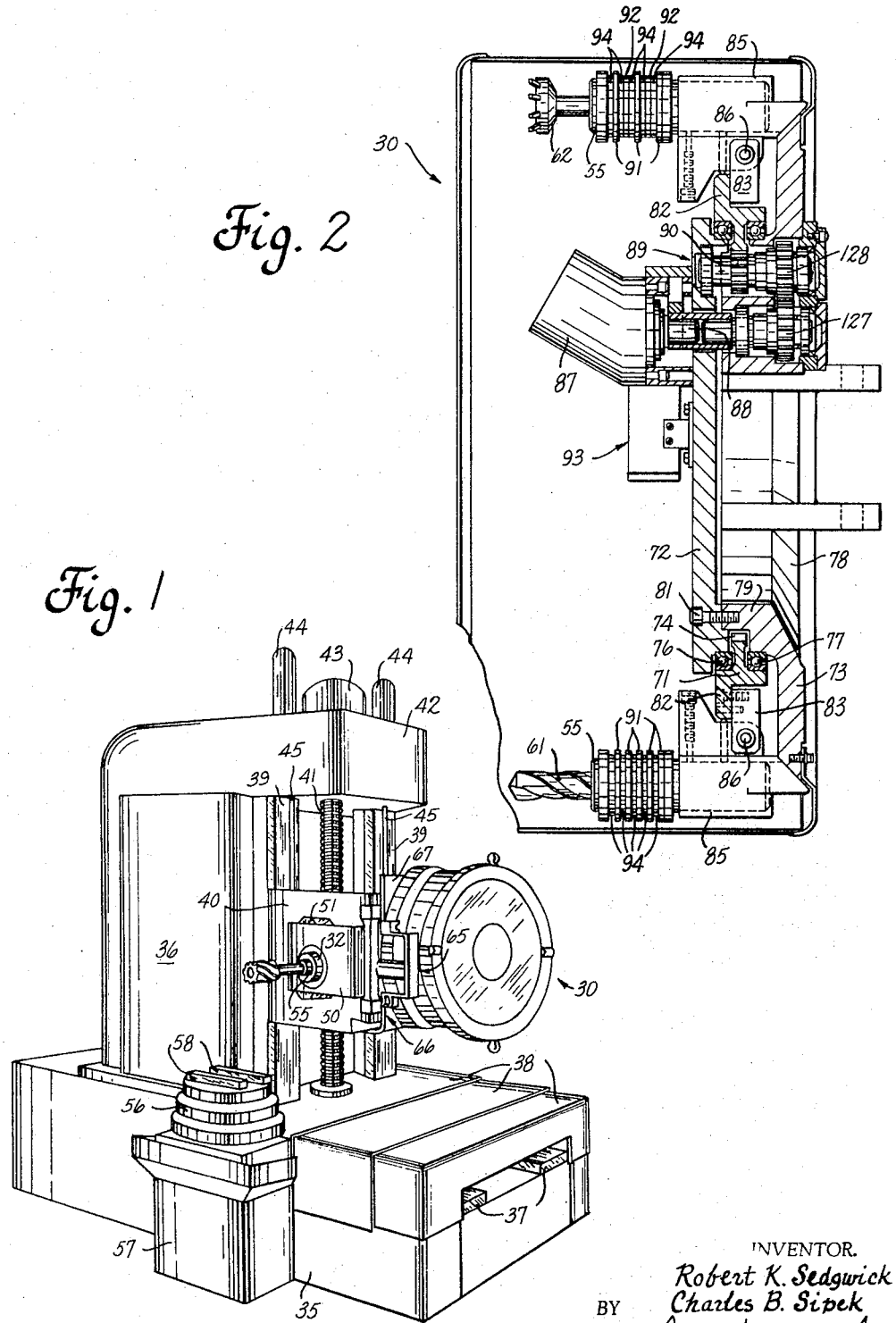

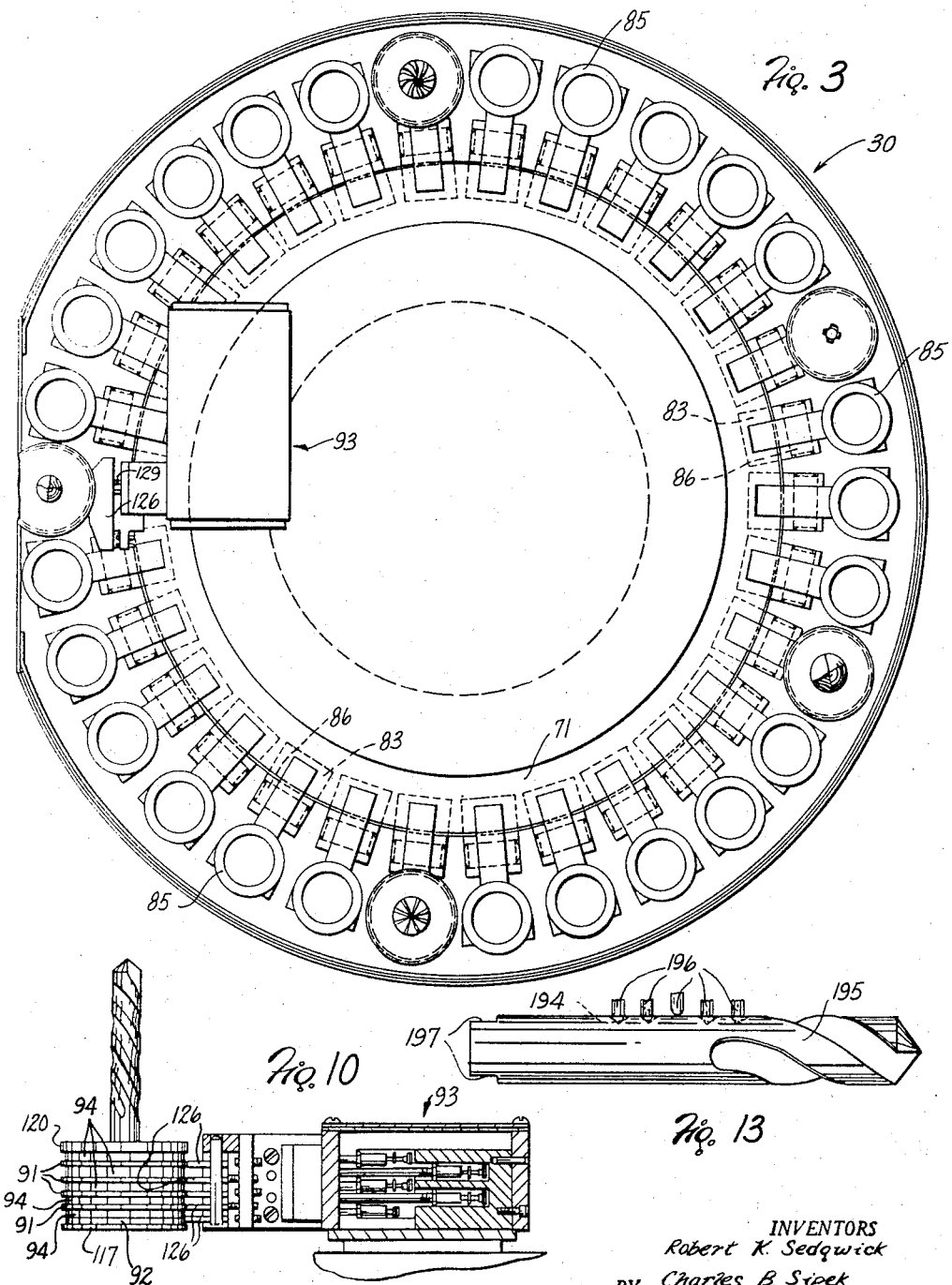

3,366,248
TOOL IDENTIFICATION SYSTEM
Robert K. Sedgwick, Waukesha, and Charles B. Sipek, Hales Corners, Wis., assignors to Kearney & Trecker Corporation, West Allis, Wis., a corporation of Wisconsin
Continuation of application Ser. No. 175,502, Feb. 26, 1962. This application June 5, 1964, Ser. No. 372,868
5 Claims. (Cl. 211—1.5)

This patent application is a continuation of our co-pending patent application, Ser. No. 175,502, filed Feb. 26, 1962, for Tool Identification System, which is a division of the Sedgwick et al. application, Ser. No. 802,924, filed Mar. 30, 1959, now Patent No. 3,052,999, dated Sept. 11, 1962, which, in turn, was a continuation in part of the Brainard et al. application, Ser. No. 744,976, filed June 27, 1958, and now Patent No. 3,052,011.

The present invention relates to a new and improved tool identification system in which identification structure is applied to tools to actuate a reader for identifying the tool.

The machine tool disclosed in the above Brainard et al. patent incorporates, among other things, the automatic selection of one particular tool from a plurality of different types and sizes of tools which are removably supported in a storage magazine. The selected tool is automatically transferred to the spindle of the machine while the previously used tool is simultaneously removed from the spindle and deposited in the storage magazine in the position from which the currently selected tool was removed.

The present application is directed to the identifying structure on the tool or toolholder in combination with a reader for reading the tool identification for controlling the indexable storage member in which the tools are stored to locate a selected tool at a particular location.

The primary object of the present invention is the provision of an improved structure for selecting individual articles, as required, from a group of articles.

Another object of the present invention is to provide apparatus for identifying tools including a tool reader which regulates the rotation of a storage member in response to actuation by identifying coding on the tools.

Another object of the present invention is to provide novel coding structure for tools which is capable of being translated by a reader to provide control signals.

Another object of the present invention is to provide a novel system under the control of tool coding structure and a code reader for effecting the indexing of a movable member.

Another object of the present invention is to provide code structure on diverse tools with certain of the structures having one code value and certain other of the structures having a different code value.

Still another object of the present invention is the application of numerical coding to a tool for identification purposes.

A more specific object of the present invention is to provide a series of abutting axially aligned rings of different diameters on each toolholder, the positions of which are different on each toolholder and are coded in a manner to separately identify each of the tools, such rings being in combination with a reader capable of reading the different ring combinations to produce control signals for controlling movement of a tool storage magazine containing the tools.

The foregoing and other objects of this invention, which will become more fully apparent from the following detailed description, may be achieved by means of the exemplifying apparatus depicted in and set forth in this specification in connection with the accompanying drawings, in which:

FIGURE 1 is a perspective view of a machine tool with a tool storage magazine in which the coded tools are stored for subsequent use in the spindle of the machine;

FIG. 2 is a view partly in elevation and partly in vertical section taken through the storage magazine of the machine showing the drive mechanism for effecting the rotation of the magazine;

Figure 12:
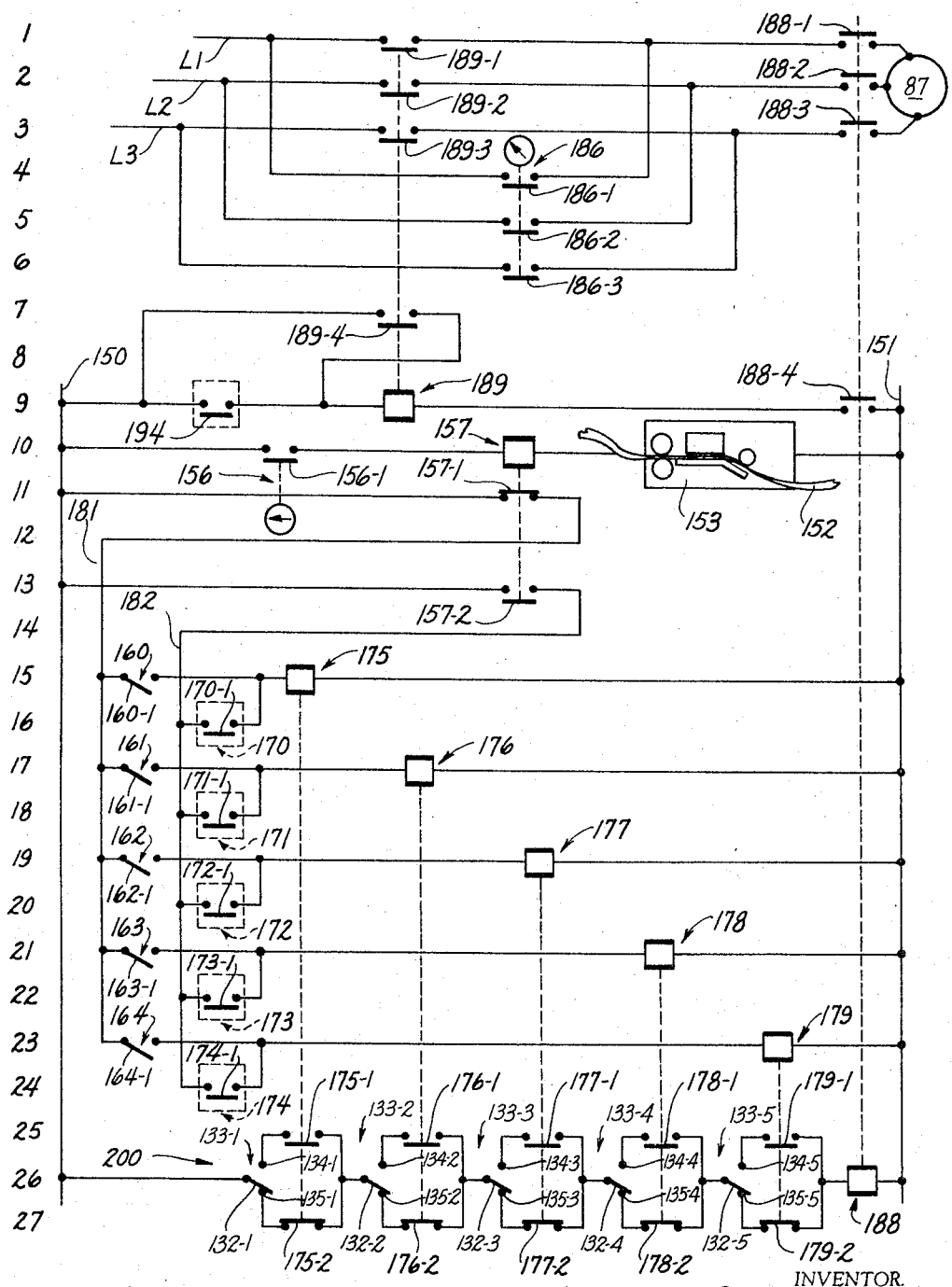

FIG. 3 is a front elevational view of the tool storage magazine of the machine depicted in FIG. 1 with the cover removed, showing the disposition of the coded tools stored therein together with selector or reader means engageable successively with the tool identification on the several toolholders to identify and automatically effect the selection of any particular tool at a tool selector and change station of the machine;

FIG. 4 is a longitudinal sectional view through a toolholder embodying the teachings of the application of identification means to a toolholder for identifying any particular tool;

FIG. 5 illustrates a modified form of the invention shown in FIG. 4 for identifying the identical tool shown in FIG. 4;

FIG. 6 is a fragmentary sectional view of a toolholder showing identifying means for identifying a different tool;

FIG. 7 is a fragmentary view similar to FIG. 6 showing the modified form of structure illustrated in FIG. 5 for identifying the identical tool depicted in FIG. 6;

FIG. 8 is an elevational view of a particular code structure in the form of a ring which is depicted in FIG. 4;

FIG. 9 is an elevational view of a different code structure also in the form of a ring which structure is stated as being a spacer ring;

FIG. 10 is a bottom plan view of the reader depicted in FIG. 3 with the reader shown in engagement with the code structure on a toolholder and operable to identify and automatically select the particular tool;

FIG. 11 is a front elevational view of the reader shown in FIG. 3 with parts broken away to reveal the operating mechanism therein and a portion of the reader or selector means;

FIG. 12 is a diagrammatic view of the electrical tool reading and selection circuit; and, FIG. 13 is an elevational view of a cutting tool having a modified coding structure applied thereto.

The present invention, when applied to articles such as toolholders, is adapted for use in effecting either visual or manual identification of a particular tool. It is also particularly well adapted for use in conjunction with automatic means for reading the identification to effect the selection of a particular tool.

In accordance with present production methods, it is common practice to change the tool at the work station of a machine tool several times in a machining cycle to cut the cost of manufacture and expedite production. The present invention is particularly well suited to the rapid automatic tool identification and selection of a desired tool or tools to reduce to a minimum the required time in effecting tool changes.

While the present invention shown in the accompanying drawings depicts a particular type of code structure, it is to be understood that the forms depicted are illustrative only and that the present invention contemplates the use of other identifying means on the several toolholders to designate both the size and the type of tool which each holder contains.

Referring now to the drawings and more particularly to FIG. 1 thereof, the coded tools of the present invention are removably stored in a rotatable tool storage magazine 30 for use in a spindle 32 of the machine tool for performing different machining operations on a workpiece. The machine tool comprises a bed 35 which slidably supports an upstanding column 36. To this end, the bed 35 is provided with horizontal ways 37 which are engaged by complementary ways (not shown) formed on the bottom of the column 36 to support the column for sliding movement along the length of the bad 35. A plurality of slidable covers 38 are attached to the bed 35 and the column 36 in telescoping arrangement and are operative to provide a protective covering over the ways 37 to prevent the chips, which are formed during a machining operation, from falling onto the ways.

The column 36 is provided with vertical ways 39 for engagement by complementary ways (not shown) formed on a saddle 40 for slidably supporting the saddle for movement in a vertical path of travel. Vertical movement of the saddle 40 in either direction is effected by rotating a screw 41 which is in threaded engagement with a recirculating ball bearing threaded nut (not shown) that is fixed to the saddle 40. The screw 41 is rotatably supported by the column 36 being journaled at its upper end in a cap 42 that is secured to the top of the column and which extends from the column beyond the ways 39 for receiving the screw 41. The lower end of the screw 41 is journaled in a suitable bearing (not shown) that is attached to the column 36 beneath the top cover 38. The screw 41 may be rotated in either direction by a motor 43 mounted on top of the cap 42 and connected to rotate the screw 41 for actuating the saddle 40 in its path of travel. A pair of hydraulic piston and cylinder mechanisms 44 are mounted on top of the cap 42 for connection to the saddle 40 by connecting rods 45 and are operative in a well-known manner to counterbalance the saddle 40 and its associated mechanism.

A spindle head or tool head 50 is carried by the saddle 40 and is provided with horizontal ways 51 which engage complementary ways formed within the saddle 40 for supporting the spindle head 50 for a sliding cross feeding movement in a horizontal path transverse to the direction of travel of the column 36. It is therefore apparent that the column 36, the saddle 40, and the spindle head 50 are each supported for movement in mutually transverse paths of travel. The spindle head 50 rotatably supports a spindle 32 that is adapted to carry a tool which, in this particular instance, is shown as being mounted in a toolholder 55 that is operatively received within the spindle 32 to rotate with the spindle to perform a machining operation. The spindle 32 is rotated by a suitable motor (not shown) in a well-known manner.

The spindle 32 supports the tool in position to operate upon a workpiece (not shown) located on a rotary index table 56 which is mounted on the top of a pedestal 57 that is secured to the front face of the bed 35. In the illustrated embodiment, the rotary table 56 is adapted to receive the workpieces attached to pallets (not shown) which are transported to the table 56 and onto a pair of rails 58 by a suitable conveyor (not shown) and clamped to the rails for complete automatic operation. However, it is to be understood, that a conventional rotary table may be provided with each individual workpiece being clamped thereto manually by the operator.

The illustrated machine tool is equipped with an automatically operable mechanical tool changer that is mounted on the saddle 40 and which is operable to effect a transfer of a selected tool from the storage magazine 30 to the spindle 32. A tool change structure suitable for use in the illustrated embodiment of the machine tool shown in FIG. 1 is depicted and described in detail in the aforementioned U.S. Patent No. 3,052,011. Generally, however, the automatically operable mechanical tool changer is mounted on the saddle 40 as shown in FIG. 1. A plurality of tools, such as the tools 61 and 62, are stored in the magazine 30. A tool change arm 65 is carried by a hydraulic unit 66 which serves to actuate the tool change arm 65 for performing its function of grasping a selected tool, withdrawing it from the magazine 30, and inserting it into the spindle 32, to render it operative for performing a machining operation.

The magazine 30 is secured to the right side of the saddle 40 for movement with the saddle. To this end, a plate 67, shown in FIG. 1, is secured to the right side of the saddle 40 and the magazine 30, in turn, is mounted on the plate 67 for movement with the saddle in its vertical path of travel. As shown in FIGS. 2 and 3, the magazine 30 comprises a tool carrying ring 71 rotatably supported between a front plate 72 and a back plate 73. The tool carrying ring 71 is provided with an integrally formed internal ring gear 74 and is rotatably supported by a pair of ball bearings 76 and 77 located on either side of the ring gear 74. The front plate 72 and the back plate 73 are provided with annular shoulders that bear on the inner races of the ball bearings 76 and 77, respectively, while the tool carrying ring 71 is likewise provided with a pair of annular shoulders upon which the outer races of the bearings 76 and 77 bear. With this arrangement, the tool carrying ring 71 is firmly supported between the front plate 72 and the back plate 73, but is freely rotatable therebetween.

The back plate 73 is provided with a central opening 78 and is defined by a hub 79 that extends laterally of the back plate 73 toward the inner surface of the front plate 72. A plurality of cap screws 81 extend through suitable openings through the front plate 72 into threaded engagement with the hub 79 to operably secure the front plate 72, the tool carrying ring 71, the back plate 73, and the ball bearings 76 and 77 in proper relationship.

The purpose of the tool carrying ring 71 is to carry the variety of tools in storage and to transfer or move the selected tools individually to a tool change ready station where they may be made accessible to the tool change arm 65. To this end, the ring 71 is provided with an outwardly extending annular ledge 82 upon which are fixedly mounted a plurality of brackets 83 in equally spaced relationship and which extend radially outwardly of the ring 71. Each of the brackets 83 is adapted to pivotally support a tool storage socket 85 which is pivotally secured to its associated bracket 83 by means of a pin 86. The sockets 85 are utilized for receiving a variety of tools so that each of the tools that are available for operation with the machine may be stored within the magazine 30 by insertion into one of the tool storage sockets 85. In the illustrated embodiment, thirty tool storage sockets 85 are shown to accommodate the storage of thirty tools and since one of the tools may be located in the spindle 32, thirty-one different tools may be made available. In the particular illustrated example of the magazine 30, shown in FIG. 3, only five tools are illustrated as being contained within the storage sockets 85, but it should be understood that similar tools may be contained in all or any portion of the storage sockets 85.

The tool which is identified for selection and insertion into the spindle 32 by the tool change arm 65 must be moved to the tool ready station of the magazine 30 and this is accomplished by power through the operation of a motor 87. An output shaft 88 of the motor 87 is connected to drive a gear train generally identified by the reference numeral 89 and which includes a gear 90 that meshes with the internal ring gear 74 of the tool carrying ring 71. As a result, actuation of the motor 87 will serve to rotate the ring 71 to move the tool storage sockets 85 and the tools which they carry in a circular path of travel.

As the motor 87 operates to effect the rotation of the tool carrying ring 71 to move the tool storage sockets 85 and the tools which they carry in a circular path, the coding on the tools formed by large rings 91 and smaller diameter rings 92, actuates a selector or tool reader 93 which thereby operates to read the coding on each of the tools successively for individually identifying the tools. When the number impressed upon the reader 93 by the coding on the particular tool coincides with the number impressed upon an electrical control system, shown in FIG. 12, for selecting the desired tool, the motor 87 will be deactuated to terminate rotation of the ring 71. When this occurs, the particular desired tool will be accurately located at the tool change station where it will be made available to the tool change arm 65 for transfer to the spindle 32. For a more detailed description of the magazine 30, reference may be made to the aforementioned U.S. Patent 3,052,011.

Referring now to FIG. 4, the toolholder 55 to which the coding structure of the present invention is applied, is preferably of a cylindrical form and is provided with an axial bore 101, the wall surface of which is provided with a continuous thread 102 adapted to receive a threaded positioning plug 103 against which the inner end of the tool 61 is positioned. The inner end of the axial bore 101 has communication with a tapered bore 104 which opens outwardly and forms a conical opening adapted to receive the segments of an axially split sleeve 106 which has its outer surface formed with a complementary taper so as to be receivable within the bore 104. The tapered bore 104 communicates with an annular cavity or recess 107 that is provided with an internal thread 108 which is adapted to receive the threaded portion of a clamping ring or nut 109. The sleeve 106 is provided with a circumferentially extending groove 110 that is adapted to receive a snap ring 111 carried within the bore of the clamp ring 109, as depicted in FIG. 4. The forward end of each of the segments of the split sleeve 106 are provided with arcuate beveled surfaces which together co-operate to form a bearing surface to be engaged by the inner surface of a tapered, annular actuating ring 112 that is seated within a bore or socket 113 formed in the tool clamp ring 109. An axially constructed bore 114 formed in the clamp ring 109 serves as an opening through which the shank of the tool may be inserted into the toolholder 55. After the tool has been inserted into the toolholder 55, the clamp ring 109 is rotated in a proper direction so that it will move inwardly into the recess 107 of the toolholder 55 and thereby move the annular actuating ring 112 axially inwardly into forceful engagement with the annular tapered surfaces formed on the segments of the split sleeve 106 thereby compressing the segments of the sleeve into tight clamping engagement with the surface of the tool to clamp and retain the tool 61 in fixed operating position therein.

The holder 55 is provided with a rearward cylindrical shank portion that is receivable in the spindle of the machine. The holder 55 also includes an enlarged cylindrical forward portion 115, the forward end portion of which is provided with a thread 116. A flange 117 is formed at the inner end of the cylindrical portion 115, the front face 118 of the flange 117 is machined and is adjacent to a machined cylindrical surface 119 which is formed on the enlarged cylindrical forward portion 115 of the holder 55. A plurality of rings 91 and 92, FIGS. 8 and 9, are provided and are adapted to be slidably received on the machined cylindrical portion or surface 119 of the toolholder 55 to provide the identifying means for a particular tool 61, which in the present instance, is a particular size of drill. The rings 91 are formed so as to have a greater outer diameter than the rings 92 in a manner to constitute code elements of different size. In the illustrated embodiment of FIG. 4, the cylindrical surface 119 is provided with five annular surfaces designated as bits, with each bit representing one digit of a five digit binary number. Each bit will be occupied by either the large diameter code ring 91 to indicate the numeral "1" for that particular digit of the binary number, or it will be occupied by a small diameter code ring 92 to indicate a "0" for that same digit. The five bits are shown spaced from one another and accordingly the corresponding spacing of the code rings is maintained by spacer rings 94 located on the cylindrical surface 119 between the code rings 91 and 92. The series of code rings and spacer rings are retained in abutting face to face relationship on the surface 119 of the holder 55 by means of a clamping ring 120, which is adapted to be threadedly engaged on the threaded end portion 116 of the holder 55.

It will be noted that five uniformly spaced grooves 91A have been formed by the alternate application of the plurality of rings 91 and spacer rings 94 to the body of the toolholder 55. These grooves 91A separate the five bits on the cylindrical surface 119. Since the five bits represent five digits of a binary number, thirty-one different numbers can be identified by the five bits. As is well-known in the art, only two numerals "0" and "1" are used in the binary numbering system. Thus, the number 00001 will identify tool No. 1, while the binary number 11111 will identify tool No. 31. In each case, it will be apparent that the coded identifying number, such as 00001 or 11111, comprises a summation or cumulative value of the individual values of the binary digits comprising the coded number. The peripheral surfaces of the rings 91 and 92 serve as coded radially extending projections to respectively designate the digits "1" and "0" of the binary system for coding each of the separate toolholders that contain different sizes and types of tools. In the illustrated embodiments herein shown, the various possible arrangements of the several rings 91 and 92 on the portion 119 of each toolholder 55 serves to provide thirty-one different coded combinations by which thirty-one different sizes and types of tools may be identified.

The coding formed by the different combinations of rings 91 and 92 are read by a selector or tool reader 93 illustrated in FIGS. 3, 10 and 11. The reader 93 includes five movable fingers 126 which are yieldably urged forwardly into engagement with either the rings 91 or 92 as the several tools are moved past the fixedly positioned reader 93 under the rotating movement of the ring 71 of the tool storage magazine 30. As previously mentioned, the ring 71 is rotated by the motor 87 that has a gear 127 keyed to its drive shaft. The drive is transmitted from the gear 127 to a gear 128 that is secured to the shaft on which the gear 90 is secured. The gear 90, in turn, meshes with the internal ring gear 74 of the storage ring 71. Energization of the motor 87 therefore serves to rotate the magazine 30 for effecting the movement of the tool holders 55 into successive engagement with the selector or reader 93.

Each of the fingers 126 is carried by separate rods 129 about which are mounted individual springs 131 that serve to urge the fingers 126 toward the rings 91 and 92 on the several toolholders 55. The rings 91 therefore serve as signal actuators by engaging the fingers 126 and actuating them toward the housing of the selector or reader 93 to thereby effect axial movement of their associated rods 129 accordingly. The inner end of each rod 129 is connected to a movable contact bar 132 of a switch 133 which is a double throw switch provided with two stationary contacts 134 and 135 that form a part of an electrical system which dictates the number of a particular tool desired for the next successive machining operation. As each of the toolholders 55, removably supported in the magazine 30, pass the fixedly positioned reader station, the fingers 126 of the reader 93 engage the several rings 91 and 92 of successive toolholders until the coded number of a particular tool corresponds with the number impressed upon the electrical control system. When the coding indicated by the reader 93 corresponds to the number impressed upon the control system, the movement of the tool storage ring 71 is automatically stopped with the particular tool in position to be withdrawn from the tool storage magazine and transferred to the spindle 32 of the machine.

Referring more particularly to FIG. 10, it will be noted that four of the five fingers 126 of the reader 93 are in contact with four rings 91 while the finger 126 that is nearest to the flange 117 of the toolholder, is in contact with a ring 92. The binary number for the particular toolholder in contact with the reader 93 is 11110 and if this is the same code number impressed upon the electrical control system, the movement of the tool storage ring will stop under combined action of the several fingers 126 and the positions of the several switches 133 which they control. When the fingers 126 are in contact with the rings 91, the digit "1" of the binary coding is indicated, and when the fingers 126 are in contact with the rings 92, the digit "0" is indicated. Likewise, when the fingers 126 are in contact with the rings 91, the movable contact 132 of the associated switch 133 is in contact with the stationary contact 134 of the particular switch 133, as depicted in FIG. 11. When the fingers 126 are in contact with the rings 92, the movable contact 132 of the associated switch 133 establishes an electrical connection with the stationary contact 135 of that particular switch.

It will be understood that the ring 71 of the tool storage magazine 30 will continue to rotate to successively bring the several toolholders 55 to the stationary reader 93. As each toolholder reaches the reader, the several fingers 126 engage either one of the rings 91 or 92 of the several toolholders and this operation continues until such time as the coded information contained on the toolholder at the reader matches the information impressed upon the electrical control system. When the coded information coincides in this manner, the control circuit becomes effective to shut off the driving power to the tool ring 71 of the storage magazine 30 and the selected tool is in position to be transferred to the spindle of the machine tool.

The electrical control system for controlling the rotational movement of the ring 71 of the magazine 30 in a tool identifying and selection operation is briefly described herein in conjuuction with FIG. 12. A more detailed disclosure may be obtained from the previously referred to Brainard et al. patent. In FIG. 12, the contact bars of the various relays and switches are identified by the reference numeral used to identify the relay or switch, with a numeral suffix added to identify each contact bar from another. In line 26, a coincidence circuit 200 includes five binary identification switches generally identified by the numeral 133. Each identification switch is identified by the general reference numeral with a numeral suffix added to indicate the particular digit in the binary number which the particular switch represents. Operating in conjunction with the binary identification switches 133, to form the coincidence circuit 200, are contact bars 175 to 179, inclusive, each having suffixes 1 and 2. As shown, a circuit is completed from the energized line 150 along line 26 to the lower contacts 135–1 to 135–5 of each identification switch 133–1 to 133–5, respectively, and across closed contact bars 175–2 to 179–2 to a relay 188 and thence to a conductor 151. Energization of the relay 188 moves its associated contact bars 188–1 to 188–3 and 188–4 to open positions, shown in FIG. 12. The contact bars 188–1 to 188–3 operate to connect and disconnect the three phase supply lines L1, L2 and L3 to the motor 87 in cooperation with the operation of a tape controlled relay 189 or a manual switch 186. The contact 188–4 serves to interrupt the circuit to the relay 189 which, when energized by the operation of a taped control switch 194, initiates the closing of the three phase line contacts 189–1 to 189–3 and the holding contact 189–4 in line 7.

Tape control is obtained by operation of a switch 156 which energizes a tape reader 153 for reading a tape 152 and also energizes a relay 157 to effect a shifting from a manual mode of operation that is established through line 11, to automatic mode operation, as established through line 13, to a common vertical line 182 and thence to the binary relays 175 to 179, inclusive, as determined by the position of the contact bars 170–1 to 174–1 of the tape controlled binary selector switches 170 to 174 respectively. Assuming that a tool No. 1, which is represented by the binary number 00001, is the tool desired, a signal obtained from the tape 152 will actuate switch contact bar 170–1 to energize relay 175, moving its contact bar 175–1 to closed position and opening its contact bar 175–2. With the contact bar 175–2 opened, the coincidence circuit along line 27 is interrupted to deenergize the relay 188. The relay 188 will now operate to close its contact bars 188–1 to 188–4, inclusive, to complete the circuit for energizing the motor 87 to drive the ring 71 of the magazine 30 for passing the coded tools past the reader 93. Since the designation circuit, as represented by the switches 170 to 174, have effected the energization of the relay 175 to move contact bars 175–1 and 175–2 to closed and open positions, respectively, actuation of the identification switches 133–2 to 133–5 by the coding on the various tools as they move past the reader 93 will cause further interruptions in the coincidence circuit. Only when identification switch 133–1 is actuated by itself, will coincidence be obtained in the coincident circuit 200 to energize the relay 188 for opening contact bars 188–1 to 188–4 to interrupt the circuit to the magazine motor 87. It is apparent that the ring 71 of the magazine 30 will continue to rotate, moving the various tools stored therein past the reader 93 until such time as the particular desired tool, having the code structure representing the binary number 00001, actuates the selector switch 133–1 in coincidence with the energized relay 175. Any tool represented by a binary number capable of being represented by the actuation of the selector switches 170 to 174, individually or in any combination, can be designated and that tool only will be identified by the reader 93 and positioned by the orientation of the ring 71 of the magazine 30 as its rotation is stopped by the energization of the relay 188.

The control system can be manually operated by actuating the mode selector switch 156 to open its contact bar 156–1 for deenergizing the relay 157 so that it will operate to move its contacts 157–2 to an open position and thereby interrupt the circuit to the common vertical line 182. Deenergization of the relay 157 also results in the closing of its associated contact 157–1 to complete a circuit to the common conductor 181 which leads to the manual selector switches 160 to 164, inclusive. By actuating the manual selector switches 160 to 164 in the proper combination to designate a desired tool to be identified and selected, and by actuating the motor energizing switch 186 to effect operation of the motor 87, the ring 71 of the magazine 30 will be rotated to pass the stored tools past the reader 93 in the identical manner described above. When the particular desired tool actuates the identification switches 133–1 to 133–5 in the same combination as the manual selector switches 160 to 164 are actuated, coincidence will be obtained to energize the relay 188 for stopping the motor 87.

Referring more particularly to FIG. 5 of the drawings, there is shown a modified form of the toolholder coding means illustrated in FIG. 4. It will be noted that the identical tool in the form of the drill 61, as shown in FIG. 4, is mounted in a toolholder 55A. The toolholder 55A bears the identical coded information on its periphery as is presented by the removable rings 91 on the periphery of the toolholder 55 in FIG. 4. However, instead of the removable rings 91, shown in FIG. 4, the axial spaced rings 191 are integrally formed on the periphery of the forward portion of the toolholder 55A. Such lands or rings 191 are produced by forming grooves 192 on the periphery of the forward portion of toolholder 55A. By being integrally formed on the toolholder 55A, the lands or rings 191 are permanently fixed thereon, and by vary- the position and relationship of the rings 191, as well as the diameter of the rings, the desired code can be placed on the toolholder 55A. In this modification, the rings 191 and grooves 192 serve the same purpose as the removable rings 91 and spacer rings 94 on the toolholder 55 in FIG. 4.

Referring more particularly to FIG. 6, it will be noted that a milling cutter 62 of a particular size and type is mounted in a toolholder 55 which is constructed in the identical manner shown in FIG. 4. However, since this tool is of a different size and type than that shown in FIG. 4, the identifying means in the form of coded information comprises rings 91 and 92 which are arranged in such a manner that the binary code number of this particular tool is represented by the number 10101, while the tool shown in FIG. 4 is represented by the binary code number 11111.

Referring more particularly to FIG. 7, it will be noted that the identical milling cutter 62, as shown in FIG. 6, is mounted in a toolholder 55A which is of the same type as that shown in FIG. 5. However, in this modification of the coding means, it will be noted that axially spaced lands or rings 191A are integrally formed on the periphery of the forward portion of the toolholder 55A and serve the same purpose as the removable rings 91 of the toolholder 55 shown in FIG. 6. In like manner, the diameter of the cylindrical surface 119 on the toolholder 55A is reduced at other bit portions identified by the reference numeral 192A to replace the small diameter rings 92 for indicating the numeral "0" for that digit of the binary number. The lands 191A and reduced diameters 192A of FIG. 7 designate the binary code number 10101 which is the identical binary number represented by the removable rings 91 and 92 in FIG. 6. By varying the position and relationship of the lands 191A and reduced diameters 192A on the toolholder 55A, any binary code number may be produced that is capable of being produced by the removable rings 91 and 92 of the toolholder 55 of FIG. 6.

While the ring 91 shown in FIG. 8 illustrates one of the rings shown in FIG. 4, it is to be understood that the outside diameter of the ring and the width of its peripheral face may be varied in accordance with the demands of any form of coding adopted for the purpose of establishing different identifying means for each toolholder containing one of the plurality of tools of different types and sizes.

In like manner, the ring 92. shown in FIG. 9, may be of any suitable diameter and its peripheral width may also be varied to suit the particular demand of the selected coding means for identifying the various types and sizes of tools from which a particular tool is to be selected.

FIG. 13 of the drawings depicts a modified embodiment of the tool coding means illustrated in FIG. 4. The coding means comprises recesses 194 integrally formed in the shank of a tool 195 at designated locations, rather than placing the coding means on the toolholder as illustrated in the prior embodiments. It should be noted further that the absence of a recess or recesses 194 in the shank of the tool is also a part of the coding means. Therefore, the presence or absence of recesses 194 in the shank of the tool 195 at the designated location determines its code number. The tool 195 may be stored in a storage medium in a manner that it can be carried past a tool reader that will read the code on the tool 195. To read the code on the tool 195, the several plungers 196 of a tool reader (not shown) similar to the reader 93 of FIG. 10, are brought into contact with the cooperating areas on the tool 195 that are designated to contain the coding means by the absence or presence of a recess 194. When the plungers 196 are in contact with the recesses 194, the digit "0" of the binary coding is indicated, and when the plungers 196 are in contact with the periphery of the shank of the tool 195, because no recess is formed in the designated location, the digit "1" is indicated. In FIG. 13, the binary code number 00100 is designated by the recesses 194 and the shank of the tool 195. By varying the position and relationship of the recesses 194, any binary code number may be produced on the tool 195 that is capable of being produced on the toolholder shown in the other embodiments. Since the coding recesses are provided on only one side of the tool 195, the tool may be conveniently positioned in the storage medium by means of the flats 197 which are formed on the end of the shank portion of the tool and they operate to properly locate the coding means with respect to the plungers 196.

While the present invention has been described in detail as applied in conjunction with the use of the binary coding as disclosed in the Brainard et al. patent, it is to be understood that such use merely affords an excellent example of its adaptability in the automatic selection of one particular tool of proper size and type from a plurality of different sizes and types of tools.

In effect, the coded tools cooperate with the tool reading head 93 to constitute a novel indexing mechanism for indexing the rotary member 71 of the tool storage magazine 30. Although the invention has been described in connection with an exemplary embodiment that comprises a tool selection mechanism especially adapted for operation with a tool change mechanism, it could be employed in other associations for indexing a movable member.

For example, the cutting tool could be omitted from the toolholder 55 in FIG. 4 so that the toolholders would be nothing more than plugs for reception in the sockets 85 of the magazine 30 for carrying the coding structure. For convenience, it can be assumed that the rotary member 71 supports sixteen sockets 85, spaced twenty-two and one half degrees apart, rather than the thirty sockets shown in FIG. 3. The control circuit may be set to call for the sixteen numbers consecutively with provisions for the operator to terminate the cycle at any stage and initiate a new cycle. With this arrangement. the operator could locate the plugs in numerical order according to the desired indexing cycle for obtaining the required indexing of the rotary member 71.

Thus, if it were desired to index the rotary member 71 to four positions spaced ninety degrees apart, the operator would utilize the four plugs that are coded to represent the decimal numbers 1 to 4 and would space them in numerical order in every fourth socket 85 with socket No. 4 in engagement with the reading head 93. The control system would then cooperate with the four coded plugs in the sockets 85 to terminate the rotation of the rotary member 71 after every ninety degrees of rotation. If positioning at forty-five degree intervals were desired, the plugs representing numbers one to eight would be employed and would be inserted consecutively in every second socket 85 on the rotary member 71. On the other hand, an uneven indexing cycle would be readily established by inserting the different plugs with the appropriated coding in the proper sockets 85.

To the best of applicants' knowledge, the present invention affords a new and novel means for applying individual identifying means to separate toolholders each of which contain a tool of different size and type.

From the foregoing detailed description of the present invention, it will readily be understood that a simple and effective means has been provided by which the selection of a particular type and size of tool may be quickly and easily accomplished from a plurality of many different types and sizes of tools.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

The principles of this invention having now been fully explained in connection with the foregoing description, we hereby claim as our invention:

1. A tool identification apparatus having a tool storage magazine;

a plurality of different types and sizes of tools having body portions removably carried by the storage magazine, each of said tools having different contours on their body portions for tool identification purposes;
a tool selector secured in position to identify tools carried by the magazine as the magazine is operated;
means in said selector for identifying each tool by its contour; and,
means for producing a signal when actuated by the identification contour on each of said tools.

2. A selectively operable tool identification apparatus having a tool storage magazine;
a plurality of different types and sizes of tools removably carried by the magazine;
a plurality of spaced lands and grooves on each of said tools, said lands and grooves being positioned and spaced differently with respect to the position and spacing of lands and grooves on any other tool so as to provide coded information distinctive of an associated tool;
a tool selector secured in position to identify the tools carried by the magazine as the magazine is operated;
identifying means in said selector for identifying each tool by its associated lands and grooves; and,
means for producing a signal to identify each tool as its lands and grooves actuate said identifying means.

3. In a tool storage member having tool storage sockets;
a plurality of tools removably carried in said sockets;
a plurality of differentiating code elements operatively associated with said tools for respectively identifying the location of the sockets containing said associated tools;
a code responsive selector carried in operative proximity to said member;
means operatively connected with said selector to provide a coded output signal; and,
means connected to said storage member to effect relative bodily movement between said storage member and said selector for moving said code elements relative to said selector to cause said code elements to activate said selector for producing said coded output signals to individually identify the location of said sockets in said storage member.

4. In an apparatus for individually identifying the individual tools of a group of tools;
a tool storage member carrying a plurality of different tools and being movable for moving the different tools separately into a tool selection station;
a source of power operably connected to said tool storage member to move said tool storage member;
an electrical control circuit connected to said source of power to control the operation of said source of power;
means to impose the identification of a desired tool upon said electrical control circuit;

a plurality of switches connected in said electrical circuit to terminate the movement of said tool storage member when actuated in the combination that corresponds to the identification of the desired tool as imposed upon said electrical control circuit; and,
actuating means associated with each of said tools for actuating said switches in a combination to identify the tool associated therewith as the tools are moved by said storage member until the desired tool is placed in said selection station.

5. In a tool identification apparatus;
a tool storage member carrying a plurality of different tools, said storage member being actuatable for moving the tools through a tool selection station successively;
actuating means operable to actuate said tool storage member for moving the tools carried thereby through the tool selection station;
an electrical control circuit connected to said actuating means to regulate the operation of said actuating means;
electrical designation elements connected in said electrical control circuit;
means to actuate said designation elements to designate the tool that is selected to be located at a tool selection station;
electrical identification elements actuatable to individually identify each of the tools that are passing into the tool selection station and connected in said electrical control circuit;
means associated with each of said tools to actuate said electrical identification elements in a manner to individually identify each of the tools as they are being moved; and,
means to terminate operation of said actuating means when the tool designated by said designation elements is identified and located in the tool selection station.

References Cited

UNITED STATES PATENTS

| | | | |
|---|---|---|---|
| 1,984,839 | 12/1934 | Murray | 40—2.2 |
| 2,761,229 | 9/1956 | Friedly | 40—2.2 |
| 2,896,769 | 7/1959 | Freeman | 198—38 |
| 3,205.480 | 9/1965 | Simjian | 340—146.2 |
| 1,683,249 | 9/1928 | Hanney | 209—80 |
| 2,275,396 | 3/1942 | Johnson | 164—115 |
| 2,866,598 | 12/1958 | Balde | 235—61.11 |
| 2,876,888 | 3/1959 | Auliffe et al. | 198—38 |
| 2,952,498 | 9/1960 | Powers et al. | 312—234.1 |
| 2,969,137 | 1/1961 | Baumann et al. | 198—38 |
| 3,071,028 | 1/1963 | Wagner | 77—3 |

JOHN PETO, *Primary Examiner.*

MALCOLM A. MORRISON, *Examiner.*

I. FAIBISCH, *Assistant Examiner.*